US005723836A

United States Patent [19]

Okuno et al.

[11] Patent Number: 5,723,836

[45] Date of Patent: Mar. 3, 1998

[54] OPERATION MECHANISM OF CIRCUIT BREAKER

[75] Inventors: Michiharu Okuno; Coichi Shichida, both of Tokyo, Japan

[73] Assignee: Mitsubishi Denki Kabushiki Kaisha, Tokyo, Japan

[21] Appl. No.: 727,297

[22] Filed: Oct. 8, 1996

[30] Foreign Application Priority Data

Oct. 12, 1995 [JP] Japan .................................. 7-264203

[51] Int. Cl.$^{6}$ .................................................. F16H 55/00

[52] U.S. Cl. ............................................................ 200/501

[58] Field of Search ................................... 200/501, 400; 74/461; 464/39

[56] References Cited

U.S. PATENT DOCUMENTS 3,175,110 3/1965 Kohlagen ............................. 74/461 X
4,002,088 1/1977 Alsch ................................. 200/501 X

FOREIGN PATENT DOCUMENTS 1-154418 6/1989 Japan .
404088247 3/1992 Japan ..................................... 74/461

*Primary Examiner*—Renee S. Luebke
*Attorney, Agent, or Firm*—Burns, Doane, Swecker & Mathis, LLP

[57] ABSTRACT

An operation mechanism of a circuit breaker which is highly reliable and inexpensive and in which an intermittent meshing of toothed wheels and resultant noise do not occur. The operation mechanism includes a gear wheel for driving a cam shaft to store mechanical energy into a breaking spring, a pinion meshed with the gear wheel and a clutch driving element provided on the same axis as the pinion and constituting a clutch with the pinion. An operational driving electric motor is provided to drive the clutch driving element. Coupling between the pinion and the clutch driving element is disconnected by means of a cam mechanism composed of an end cam provided on an end face of the gear wheel and the clutch driving element, in the vicinity of the stationary positions of the cam and the gear wheel in the force storing state of a closing spring.

6 Claims, 6 Drawing Sheets

OPERATION MECHANISM OF CIRCUIT BREAKER

BACKGROUND OF THE INVENTION

1. Field of the Invention

The present invention relates to an operation mechanism of a circuit breaker and more particularly relates to a force storing mechanism of a closing spring.

2. Description of the Related Art

It is a requirement by a standard for the operation mechanism of a circuit breaker to have a construction where the opening and closing of a circuit can be performed in succession without a delay. In order to meet the requirement of such standard, a conventional operation mechanism of circuit breaker is constructed so that a circuit closing operation is performed immediately after a circuit opening operation by the mechanical energy stored in a force storing mechanism so as to make possible another circuit opening operation in succession.

As an operation mechanism used in a conventional circuit breaker, the construction and operation thereof will be described below by way of the operation mechanism as disclosed in Japanese Unexamined Patent Publication No. 1-154418.

FIG. 7 shows the construction of an operation mechanism of circuit breaker in its circuit-closing state.

A lever 2 linked with a movable contact 100 is fastened to a main shaft 3 to which a rotating force is applied clockwise by a breaking spring 101 and is held in closing position by a tripping latch 4. When the tripping latch 4 has been turned counterclockwise by a tripping trigger mechanism 5, the tripping latch 4 and the lever 2 are disengaged. The lever 2 is thus turned counterclockwise by the rotating force of the breaking spring 101 whereby the movable contact 100 is opened.

A lever crank mechanism (hereinafter simply referred to as "mechanism") with its driver served by the closing lever 7 is formed as having: a crank formed between the center of a gear wheel 90 which is fixed on a cam shaft 8 so as to be rotated together with the cam shaft 8 and a connecting pin 90*a* provided on a side surface of the gear wheel 90; a lever served by a closing lever 7 fixed on a closing main shaft 6 to which a rotating force is applied counterclockwise by a closing spring 102; and a connecting rod served by a link 10 for linking the connecting pin 90*a* provided on the side surface of the gear wheel 90 and an end portion of the closing lever 7. The gear wheel 90 is kept stationary by a closing latch 11 at its closing awaiting position which is slightly shifted clockwise from a change point of the mechanism. When the closing latch 11 is turned counterclockwise by a closing trigger mechanism 12, the closing lever 7 is turned counterclockwise and the gear wheel 90 is turned clockwise, respectively, by mechanical energy stored on the closing spring 102. A cam 13 fastened to the cam shaft 8 together with the gear wheel 90 is then rotated so that the lever 2 in its breaking position is returned to its closing position against the rotating force of the breaking spring 101 to open the movable contact 100. Whereby, the mechanical energy is stored in the breaking spring 101.

Upon the counterclockwise rotation of a pinion 95 meshed with the gear wheel 90, the gear wheel 90 is rotated clockwise against the rotating force of the closing spring 102 and is restored to the state as shown in FIG. 7.

The above-described elements are assembled with a frame 1 to form an operation mechanism.

In the state of FIG. 7, the meshing portion between the gear wheel 90 and the pinion 95 is as shown in FIG. 8. A predetermined number of teeth of the gear wheel 90 are removed from the portion facing the pinion 95 and, furthermore, a notch 91 is provided thereon. A synchronization click 92 having two pawls of the same tooth type as the gear wheel 90 is mounted at the interior of the notch 91 so as to oscillate therein by means of a pin 93 and a compression spring 94. For this reason, when the pinion 95 is rotated counterclockwise to press the meshing tooth surface of the pawl on the far side from the pin 93 of the synchronization click 92, a clockwise moment of rotation about the pin 93 results to act on the synchronization click 92 due to the pressure angle on the contacting tooth surface, whereby the synchronization click 92 is turned clockwise about the pin 93 to disconnect the meshing engagement with the pinion 95 and it will not rotate the gear wheel 90. When the gear wheel 90 is rotated clockwise, on the other hand, the pawl on the far side from the pin 93 of the synchronization click 92 is meshed with the pinion 95 and the pressing force acting upon the pawl acts as the moment of rotation for turning the synchronization click 92 counterclockwise. Since, however, the synchronization click 92 is not allowed to turn to the outside of the gear wheel 90, the position of the synchronization click 92 is unchanged from its state as shown in the figure and the pinion 95 is rotated. The pinion 95 is caused to mesh with the pawl on the near side toward the pin 93 of the synchronization click 92 and with tooth of the gear wheel 90 next to the synchronization click 92 sequentially in that order so that the meshing engagement between the gear wheel 90 and the pinion 95 is restored.

The aim of employing the mechanism as described above at the meshing portion of the gear wheel and the pinion is to prevent an occurrence of excessive force due to the rotating force of the pinion on the driving source of the pinion or on the closing latch mechanism after the completion of force storing operation when mechanical energy is to be stored in the closing spring after two circuit opening operations and one circuit closing operation are performed in succession at the circuit breaker.

Even though the force storing operation is complete, the driving source for rotating the pinion is unable to immediately stop due to its inertia. For this reason, until the driving source comes to a complete stop, the synchronization click is oscillated so that the collision resulting from meshing of the synchronization click with the tooth surface of the pinion occurs repeatedly. Since failure on the pinion and the synchronization click due to such collision of the tooth surfaces must be avoided, it is necessary to scrutinize their material and method of machining, resulting in a disadvantage that the corresponding part becomes expensive. Further, there is also a problem that an occurrence of noise cannot be avoided due to the meshing of the tooth surfaces of the synchronization click and the pinion.

SUMMARY OF THE INVENTION

To solve the problems as described above, it is an object of the present invention to provide an operation mechanism of a circuit breaker which is reliable and inexpensive and does not cause an intermittent meshing of gears and a noise resulting therefrom.

In order to achieve the above object, according to one aspect of the present invention, there is provided an operation mechanism of a circuit breaker, comprising: a breaking spring for causing a circuit opening operation by discharging stored mechanical energy; a closing spring for causing a circuit closing operation by discharging stored mechanical energy to rotate a cam; a force storing device for storing mechanical energy in the breaking spring and the closing spring; and a driving mechanism for driving the force storing device, the driving mechanism being connected to a cam shaft having the cam fastened thereto with a gear train, wherein the gear train comprises a gear wheel fastened to the cam shaft, a pinion meshed with the gear wheel and a clutch driving element provided on the same axis as the pinion and constituting a clutch together with the pinion, wherein the driving mechanism comprises an operational driving motor for driving the clutch driving element, and wherein coupling of the pinion and the clutch driving element is disconnected by a cam mechanism composed of an end cam provided on an end face of the gear wheel and the clutch driving element, in the vicinity of the stationary positions of the cam and the gear wheel in the force storing state of the closing spring.

DETAILED DESCRIPTION OF THE PREFERRED EMBODIMENTS

Embodiment 1

A first embodiment of the present invention will now be described by way of the accompanying drawings.

Figure 1:
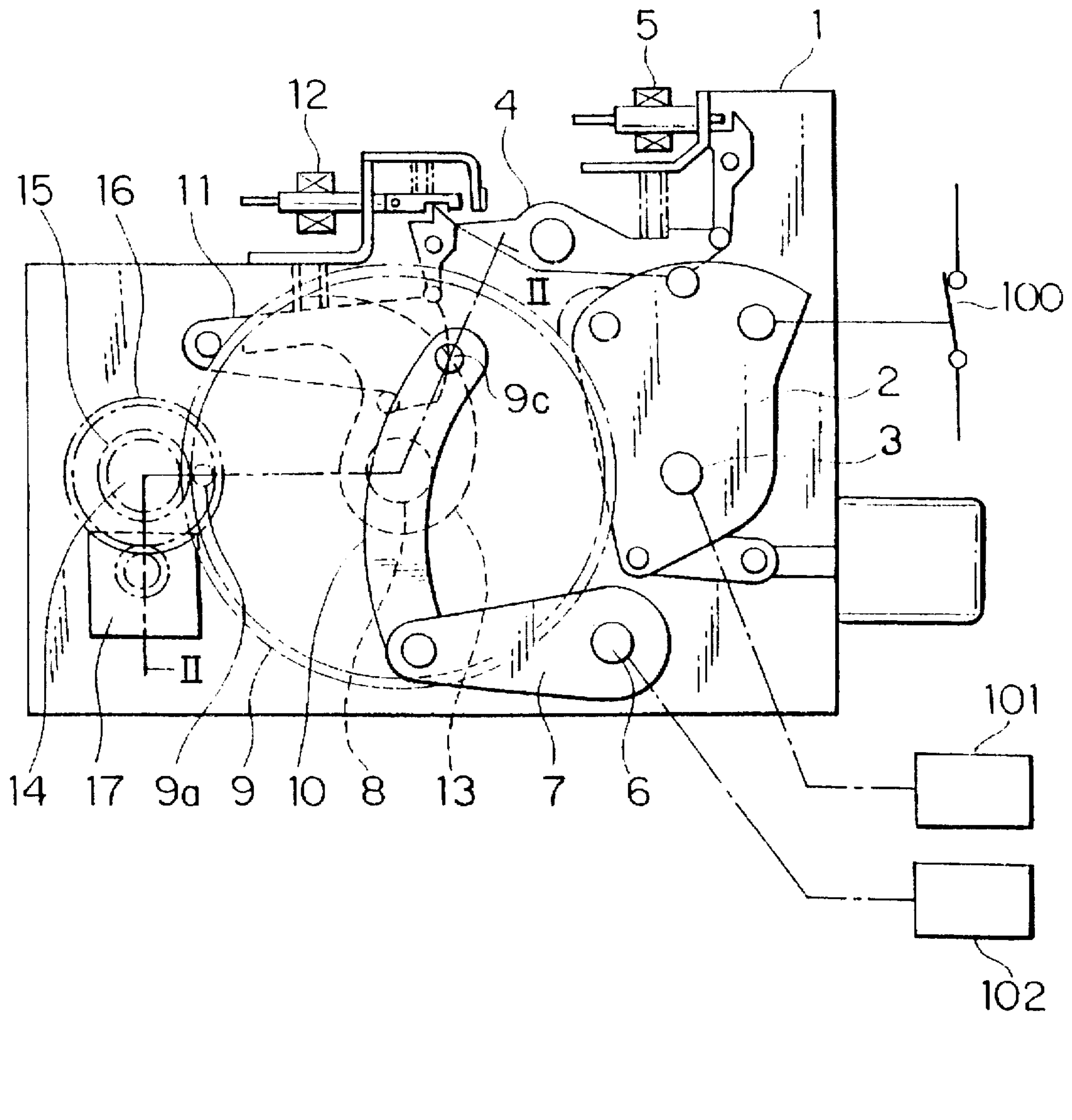
FIG. 1 shows the construction of operation mechanism of a circuit breaker in its circuit-closing state according to a first embodiment of the present invention.
Figure 2:
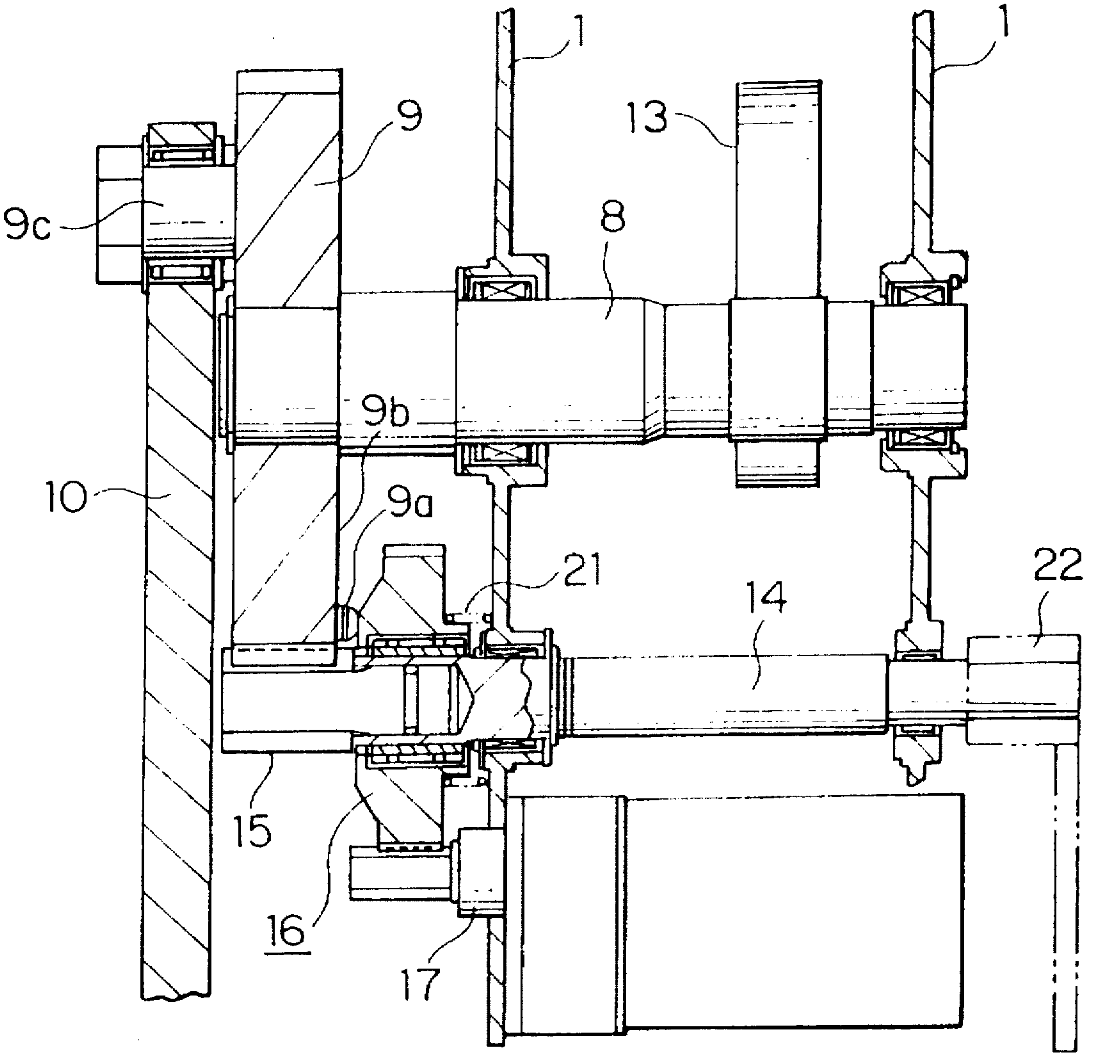
FIG. 2 is a section taken along II—II of FIG. 1.
Figure 3A:
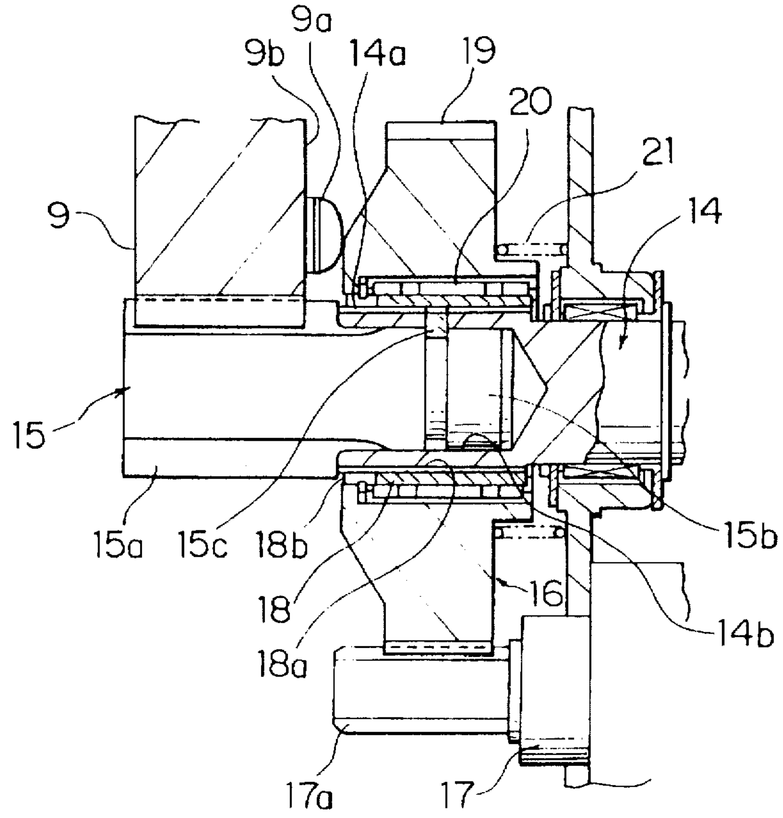
FIG. 3A is a sectional view showing in detail the clutch portion in FIG. 2.
Figure 3B:
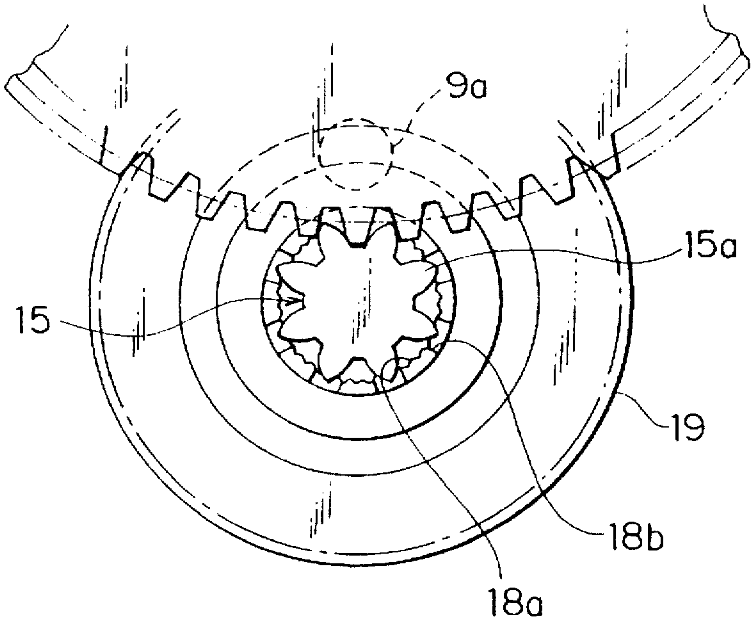
FIG. 3B is a side view showing in detail the clutch portion in FIG. 2.
Figure 7:
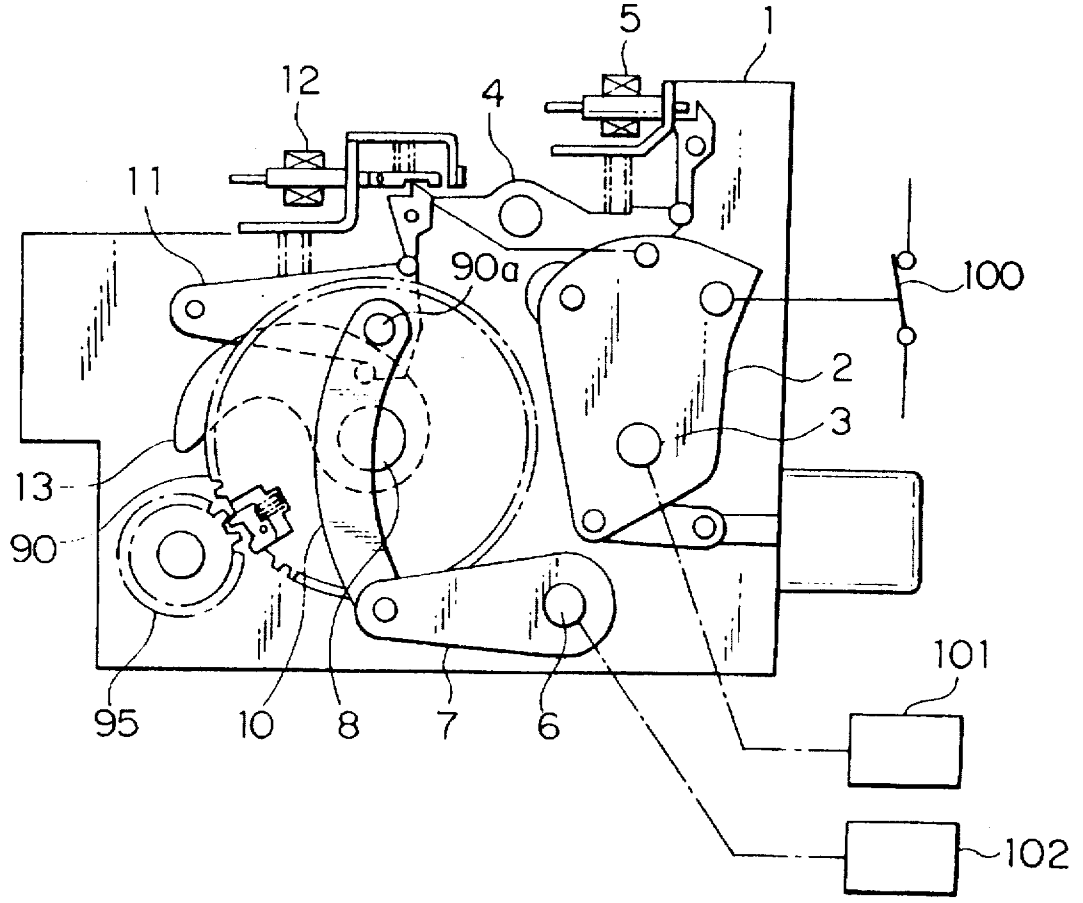
FIG. 7 PRIOR ART
FIG. 7 is a front view showing the operation mechanism in the circuit-closed state of a conventional circuit breaker.
Figure 8:
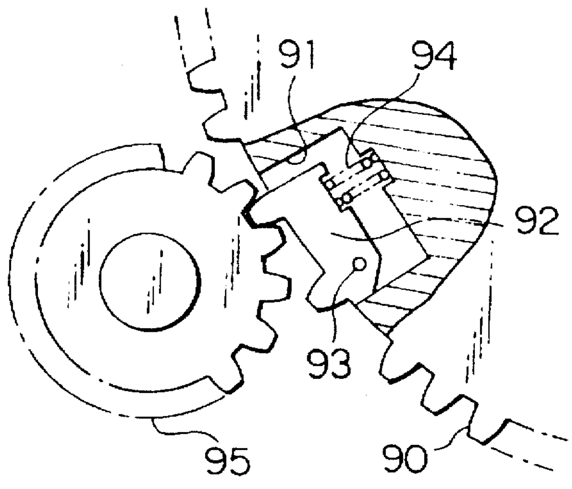
FIG. 8 PRIOR ART
FIG. 8 shows in detail a portion in FIG. 7.

FIG. 1 shows an operation mechanism according to the present invention; FIG. 2 shows a section along II—II of FIG. 1; and FIGS. 3A and 3B show in detail the clutch portion in FIG. 2. In the figures, like or corresponding portions as those in FIG. 7 for showing the above-described conventional operation mechanism of circuit breaker are denoted by like reference numerals and an overlapping description with respect to the function and operation thereof will be omitted.

A clutch shaft 14 and the rotating shaft of an operational electric motor 17 are provided in parallel to a cam shaft 8, and these three shafts are drivingly connected with each other through a gear train consisting of: a gear wheel 9; a pinion 15; a clutch driving element 16 having a toothed wheel element on the outer periphery thereof; and a toothed wheel formed at an end portion of the shaft of the operational electric motor 17. A clutch is formed by the pinion 15 and the clutch driving element 16.

The cam shaft 8 penetrates through a frame 1 and is supported at its penetrating portions through the frame 1 by means of a pair of bearings. It has a cam 13 fitted thereon at a midpoint between the frames 1 and the gear wheel 9 having one projection 9*a* on the end surface 9*b* toward the frame 1 fitted on one end portion thereof so that the cam shaft 8 and cam 13 are rotated together as a single body by the rotation of the gear wheel 9.

The clutch shaft 14 penetrates through the frame 1 in a similar manner as the cam shaft 8 and is supported at its penetrating portions through the frame 1 by means of a pair of bearings. The clutch shaft 14 has a serration 14*a* on the outer periphery on the end portion thereof toward the side corresponding to the side of the cam shaft 8 with the gear wheel 9 being attached and is provided with a hollow portion 14*b* at a center portion thereof having a cylindrical wall surface which is concentric with the serration 14*a*. The pinion 15 consists of a toothed wheel portion 15*a* meshed with the gear wheel 9 and a shaft portion 15*b* integrally formed therewith. The shaft portion 15*b* is fitted rotatably in the hollow portion 14*b* of the cam shaft through a stopper member 15*c*. The clutch driving element 16 is fitted in the serration 14*a* so as to be movable in the axial direction thereof. The traveling distance of the clutch driving element 16 is regulated by the height of a projection 9*a* provided on the gear wheel 9 so that the meshing engagement between the pinion 15 and radial groove 18*b* of an inner wheel 18 to be described later is disconnected in the state where the clutch driving element 16 is pressed by the projection 9*a* and is moved toward the frame 1. Further, a manual handle 22 can be mounted as required on the other end of the clutch shaft 14. It should be noted that the projection 9*a* provided on the gear wheel 9 is adapted such that it presses the clutch driving element 16 toward the frame 1 to cause a displacement of a predetermined distance on the serration 14*a* from the position where the gear wheel 9 when rotated clockwise has slightly passed in the clockwise direction a change point of the mechanism to a suitable position beyond a closing awaiting position thereof.

The relationship between the gear wheel 9 and the clutch driving element 16 may be regarded as the cam mechanism having an end cam formed by the end face 9*b* of the gear wheel 9 and the projection 9*a* and a follower served by the clutch driving element 16. It should be noted that, naturally, the conical surface provided on the clutch driving element 16 toward the gear wheel 9 also serves a part of the function as an end cam.

The gear wheel 9 is connected to the closing main shaft 6 via a connecting pin 9*c* provided on a side surface of the gear wheel 9, the link 10 and the closing lever 7.

The force storing device comprises the cam shaft 8, the gear wheel 9, the connecting pin 9*c*, the cam 13, the clutch shaft 14, the pinion 15 and the clutch driving element 16.

The clutch driving element 16 is constituted by an inner wheel 18, an outer wheel 19 and an one-way clutch 20. The inner wheel 18 is provided on the inner diametrical surface thereof with a serration 18*a* of inside teeth meshing with the serration 14*a* of the clutch shaft 14 and is fitted in the one-way clutch 20 at an outer diametrical surface thereof. Further, the end portion facing the pinion 15 of the inner wheel 18 is provided with radial grooves 18*b* of the same number as the number of teeth of the pinion 15, and which is fitted with the teeth portion of the pinion 15.

The outer wheel 19 is meshed at an outer peripheral toothed wheel portion thereof with a toothed wheel portion 17*a* formed on the shaft end of the operational electric motor 17 and fitted at an inner diametrical surface thereof with the one-way clutch 20 so that it is mutually rotatable with respect to the inner wheel 18 while not causing a relative movement in the axial direction. The one-way clutch 20 is adapted such that it transmits the torque from the outer wheel 19 to the inner wheel 18 only when the outer wheel 19 is rotated counterclockwise with respect to the inner wheel 18 as seen from the side of the pinion 15. The tooth width of the toothed wheel portion 17*a* formed on the shaft end of the operational electric motor 17 is adapted so that, even when the driving element 16 is displaced by the projection 9*a*, the two are continually meshed with each other.

A clutch spring 21 for continually pressing the clutch driving element 16 toward the pinion 15 is provided between the frame 1 and the clutch driving element 16.

The operation of the mechanism will now be described.

It is not different from the conventional operation mechanism with respect to the sequence of the closing operation including: the disengagement of the closing latch 11 by the closing trigger mechanism 12; movement of the mechanism consisting of the closing lever 7, the gear wheel 9 and the cam 13 through discharging of the mechanical energy stored in the breaking spring 101 and the closing spring 102; and opening and closing of the movable contact 100.

The operation for storing mechanical energy in the closing spring 102 after the closing of the movable contact 100 is as follows.

The operational electric motor 17 is rotated clockwise and the clutch driving element 16 is rotated counterclockwise by the toothed wheel portion 17*a* formed on the shaft end of the operational electric motor 17. In the state where the closing spring 102 has discharged mechanical energy, since the position of the projection 9*a* provided on a side surface of the gear wheel 9 and the position where the gear wheel 9 and the pinion 15 are to be meshed are located substantially opposite to each other as interposed by the axial center of the cam shaft 14, the clutch driving element 16 is pressed by the clutch spring 21 so that an end portion of the tooth surface of the pinion 15 and the radial grooves 18*b* provided on the end portion of the inner wheel 18 are meshed with each other whereby the pinion 15 is rotated in the same direction as the clutch driving element 16. The gear wheel 9 meshed with the pinion 15 is thus rotated and mechanical energy is stored in the closing spring 102. Then, when the gear wheel 9 being rotated has slightly passed in the clockwise direction the change point of the mechanism, the projection 9*a* presses the clutch driving element 16 to move it toward the frame 1. Thus the linkage between the pinion 15 and the clutch driving element 16 is disconnected. After the disengagement of linkage between the pinion 15 and the clutch driving element 16, the gear wheel 9 is furthermore rotated clockwise by a small amount and is stopped at its closing awaiting position by the closing latch 11.

Since the linkage between the clutch driving element 16 and the pinion 15 is disconnected from the point immediately before the reaching of mechanism to its closing awaiting position, a force due to output torque of the operational electric motor 17 does not act upon the closing latch 11 even if the operational electric motor 17 rotates after the stopping of the gear wheel 9. Since, naturally, no intermittent meshing of the toothed wheels occurs, a noise will not be generated.

In order to manually perform the store of mechanical energy into the closing spring 102, it suffices to mount a manual handle 22 on the end portion of the clutch shaft 14 to rotate the clutch shaft 14. Even when the manual handle 22 rotates further after the stopping of the gear wheel 9 due to the closing latch 11, since the linkage between the clutch driving element 16 and the pinion 15 is disconnected at a predetermined position in a similar manner as the operation by the operational electric motor 17, a force due to the torque applied on the manual handle 22 will not act upon the closing latch 11.

It should be noted that, while the clutch consisting of the pinion 15 and clutch driving element 16 is in its connected state when the gear wheel 9 rotates to perform the closing operation, the outer wheel 19 does not rotate due to the one-way clutch 20. Accordingly, since the operational electric motor 17 is not driven from the side of the cam shaft 8, there is no increase in the equivalent moment of inertia as seen from the cam shaft 8 which regulates the angular velocity of rotation of the cam shaft 8 in the closing operation and the operation time of the circuit breaker may be quickened. In another point of view, it is possible to make the closing spring 102 for driving the closing main shaft 6 smaller. Further, since the operational electric motor 17 does not rotate except the driving rotation in storing the mechanical energy into the closing spring 102, it does not require a mechanical strength corresponding to a rotating speed exceeding the driving rotation so that a standard component part may be used, also resulting in an advantage that the operation mechanism of the circuit breaker can be achieved at a low cost.

In the above description, while an end cam is formed by the end face 9*b* of gear wheel 9 and the projection 9*a*, the invention is not limited to such and an end cam fastened to the gear wheel 9 may be used as required.

Figure 4:
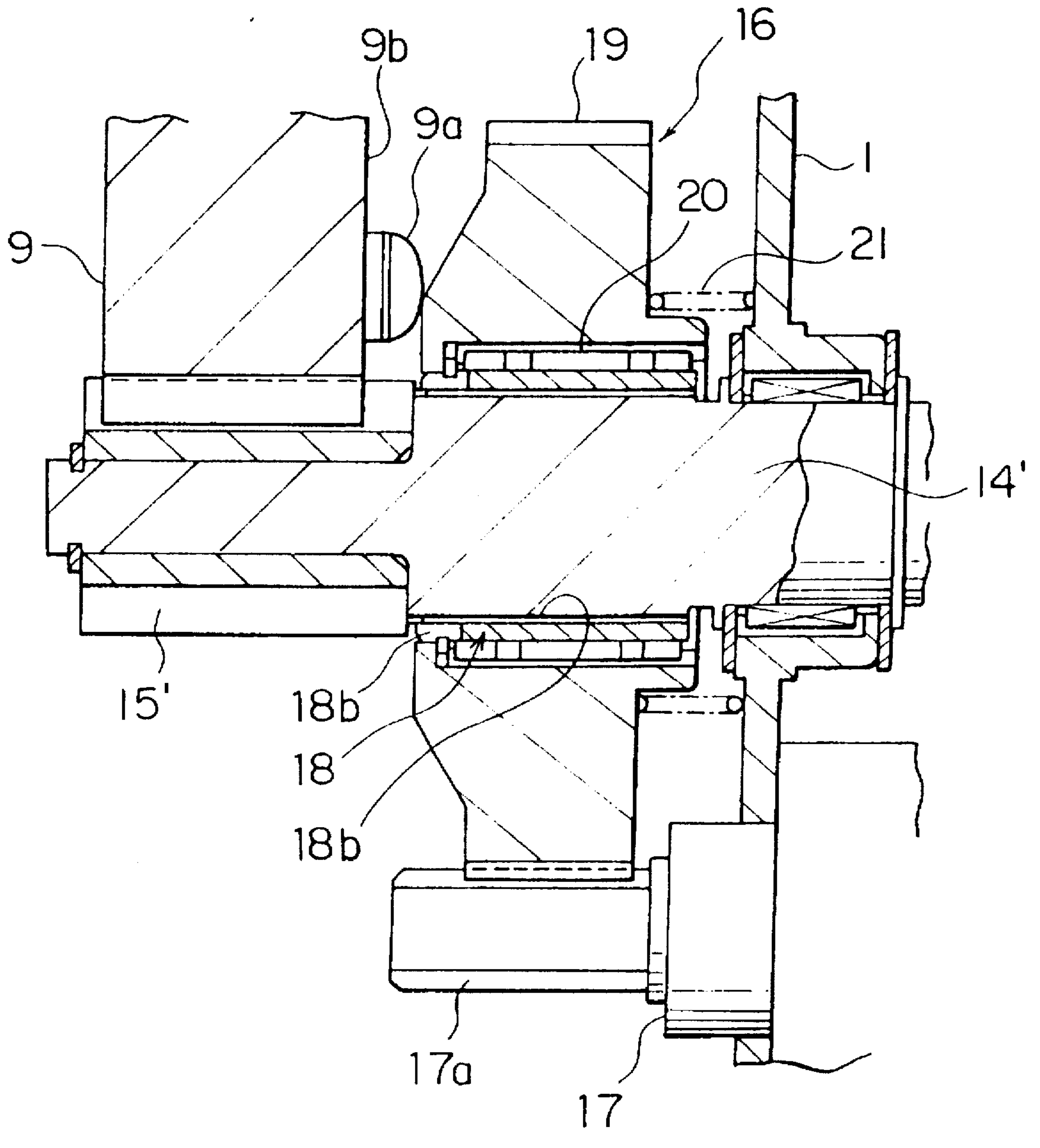
FIG. 4 shows in detail the clutch portion in an adapted example of the first embodiment of the present invention corresponding to FIGS. 3A and 3B.

Further, while the pinion 15 has been described as fitted in a rotatable manner in the hollow portion 14*b* provided at an end of the clutch shaft 14, it is also possible for example as shown in FIG. 4 that a pinion 15' having a cylindrical inner diametrical surface be fitted in a rotatable manner on an extended portion of a clutch shaft 14' which has the extended shaft end portion on the side of the serration 14*a*.

Furthermore, while the inner wheel 18 has been described as having radial grooves 18*b* of the same number of teeth as the pinion 15 which is reciprocally fitted to the pinion 15, it is also possible to provide grooves of the same shape as the tooth shape of the pinion 15 instead of the radial grooves 18*b*.

Embodiment 2

Figure 5:
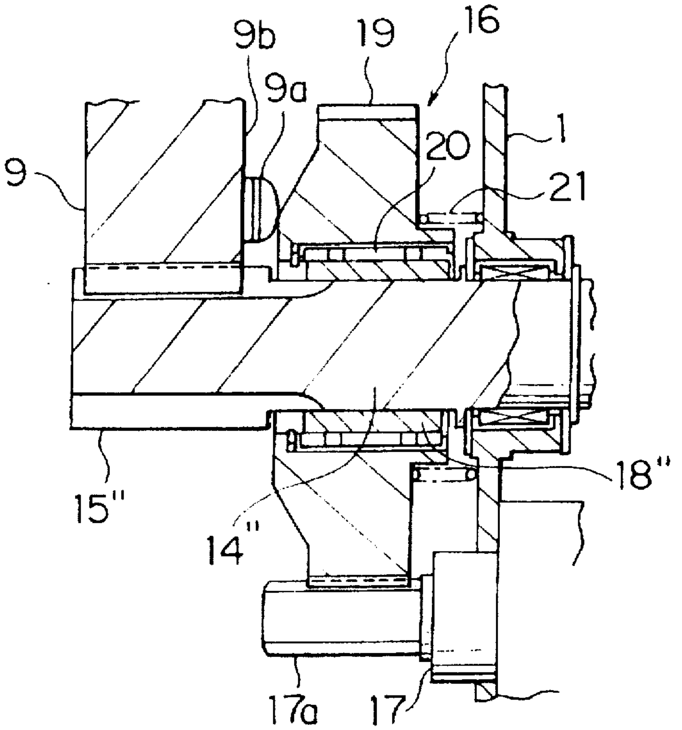
FIG. 5 shows in detail the portion of clutch in a second embodiment of the present invention.

While, in the first embodiment of the present invention, a meshing portion by means of the serration 14*a* is provided between the clutch shaft 14 and the inner wheel 18, it is also possible as shown in FIG. 5 that a pinion 15" is formed on the shaft end of a clutch shaft 14" and that an inner wheel 18" of which the inner diametrical surface is formed in a circular cylindrical shape is fitted so as to be rotatable with respect to the clutch shaft 14". In this case, when the clutch shaft 14" is rotated by a manual handle mounted on the end portion of the clutch shaft 14", a force due to torque applied to the manual handle is applied to the closing latch 11. Therefore, it is necessary to rotate the shaft of the operational electric motor 17 when the store of mechanical energy into the closing spring is to be performed manually. Although the required angle of rotation in the manual operation is increased in accordance with the ratio of number of teeth of the operational electric motor 17 to the clutch driving element 16, the required torque thereof can be reduced.

Figure 6:
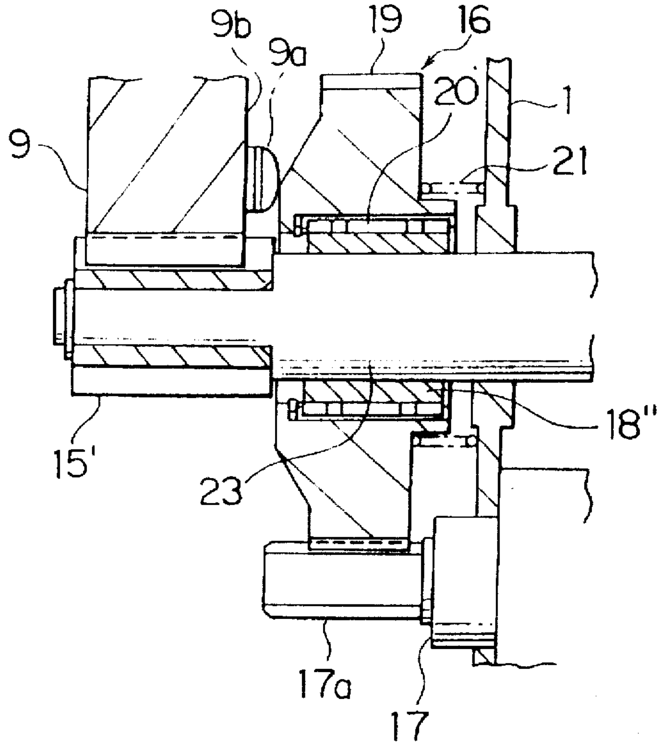
FIG. 6 shows in detail the portion of the clutch in a modification of the second embodiment corresponding to FIG. 5.

It should be noted that, if the pinion 15" in FIG. 5 is formed as the pinion 15' having a circular cylindrical inner diametrical surface as shown in FIG. 4 of Embodiment 1 and is fitted to the clutch shaft, the form as shown in FIG. 6 results; since a clutch shaft 23 is not required to rotate, it is not necessary to provide bearings at the portion penetrating through the frame 1 so that a simpler construction can be achieved.

While, in the above description, a serration or a toothed wheel mechanism is to be used at the meshing portion between the clutch shaft 14 and the inner wheel 18 and at the meshing portion between the pinion 15 and the inner wheel 18, use of an equivalent to the torque transmission mechanism such as a hexagon nut and spanner is naturally possible without departing from the construction of the present invention.

Of the pinion 15, the portion meshing with the gear wheel 9 and the portion connected to the clutch driving element 16 may naturally be formed as different toothed wheel elements and this is effective to increase the degree of freedom in selecting the velocity ratio of the gear wheel 9 to the pinion 15.

Further, while the case of manually performing storage of mechanical energy into the closing spring 102 has been described as mounting the manual handle 22 on an end portion of the clutch shaft 14, it is also possible to provide a toothed wheel for manual hoisting to be meshed with the clutch driving element 16 and to rotate this toothed wheel by means of a manual handle.

In order to prevent a failure of the operation mechanism of the circuit breaker due to backward rotation of the cam shaft, it is important that the manual handle is constructed by using a one-way clutch or the like so as not to apply a torque in a direction other than that in a predetermined direction.

What is claimed is:

1. An operation mechanism of a circuit breaker, comprising:

a breaking spring for causing a circuit opening operation by discharging stored mechanical energy;

a closing spring for causing a circuit closing operation by discharging stored mechanical energy to rotate a cam;

a force storing device for storing mechanical energy in said breaking spring and said closing spring; and a driving mechanism for driving said force storing device, said driving mechanism being connected to a cam shaft having said cam fastened thereto with a gear train, wherein said gear train comprises a gear wheel fastened to said cam shaft, a pinion meshed with said gear wheel and a clutch driving element provided on the same axis as said pinion and constituting a clutch together with said pinion, wherein said driving mechanism comprises an operational driving electric motor for driving said clutch driving element, and wherein coupling between said pinion and said clutch driving element is disconnected by a cam mechanism composed of an end cam provided on and formed by an end face of said gear wheel and said clutch driving element, in the vicinity of stationary positions of said cam and said gear wheel in a force storing state of said closing spring.

2. An operation mechanism of a circuit breaker according to claim 1, wherein said end cam further comprises a projection provided on said end face.

3. An operation mechanism of a circuit breaker according to claim 1, wherein said clutch driving element is fitted axially movable on a clutch shaft through a serration and wherein said pinion is fitted rotatably on said clutch shaft.

4. An operation mechanism of a circuit breaker according to claim 1, wherein coupling of said clutch is achieved by radial grooves provided at a portion facing said pinion of said clutch driving element and fitted to respective teeth of said pinion.

5. An operation mechanism of a circuit breaker according to claim 1, wherein said clutch driving element comprises: an inner wheel fitted to a clutch shaft and coupled with said pinion to transmit torque; a one-way clutch fitted to said inner wheel; and an outer wheel fitted with said one-way clutch, formed as relatively rotatable and restricted of relative axial movement with respect to said inner wheel and driven by said operational electric motor.

6. An operation mechanism of a circuit breaker according to claim 1, wherein said pinion and said clutch driving element are provided on a clutch shaft fastened to a frame.

* * * * *